United States Patent
Tseng

(10) Patent No.: US 6,529,235 B1
(45) Date of Patent: Mar. 4, 2003

(54) AUTO WHITE BALANCE APPARATUS AND METHOD IN A DIGITAL CAMERA WITH A STROBE

(75) Inventor: Li-Wen Tseng, FengShan (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 10/101,850

(22) Filed: Mar. 21, 2002

(51) Int. Cl.$^7$ .............................................. H04N 9/73
(52) U.S. Cl. .................................. 348/223.1; 348/225.1
(58) Field of Search ........................ 348/223.1, 224.1, 348/655, 371, 225.1, 227.1, 229.1

(56) References Cited

U.S. PATENT DOCUMENTS

| | | | | |
|---|---|---|---|---|
| 4,485,336 A | * | 11/1984 | Yoshiyama et al. | 250/226 |
| 4,682,210 A | * | 7/1987 | Ikemura et al. | 348/227.1 |
| 5,001,552 A | * | 3/1991 | Okino | 348/224.1 |
| 5,038,205 A | * | 8/1991 | Kondo et al. | 348/225.1 |
| 5,093,716 A | * | 3/1992 | Kondo et al. | 348/224.1 |
| 5,568,194 A | * | 10/1996 | Abe | 348/223.1 |
| 5,808,681 A | * | 9/1998 | Kitajima | 348/223.1 |
| 6,195,127 B1 | * | 2/2001 | Sugimoto | 348/234 |

* cited by examiner

Primary Examiner—Wendy R. Garber
Assistant Examiner—James M. Hannett
(74) Attorney, Agent, or Firm—Bacon & Thomas

(57) ABSTRACT

There are provided an auto white balance apparatus and an auto white balance method in a digital camera with a strobe. The digital camera has an image sensor for capturing external images and a flash module. The flash module stops flashing when a first voltage signal representing a detected brightness of the flash module is larger than a reference voltage signal. An exposure time is determined based on brightness of the image captured by the image sensor. The flash module detects brightness based on the exposure time for establishing a second voltage signal. A white balance adjustment is performed based on a ratio of the reference voltage signal and the second voltage signal.

4 Claims, 3 Drawing Sheets

AUTO WHITE BALANCE APPARATUS AND METHOD IN A DIGITAL CAMERA WITH A STROBE

BACKGROUND OF THE INVENTION

1. Field of the Invention

The present invention relates to the white balance for a camera and, more particularly, to an auto white balance apparatus and an auto white balance method in a digital camera with a strobe.

2. Description of Related Art

It is known that the color of an object is decided by two factors: the selective reflecting spectrum and the light source spectrum of the environment that the object locates. Thus, one object can exhibit different colors when light illuminating onto the object is different from the previous one. Conventionally, a white balance device is provided for a digital camera to make the captured image exhibit consistent color in environments with light sources of different color temperatures.

For detecting or estimating the light source of the environment, a number of techniques have been proposed. A simple one is to completely rely on the strobe apparatus in a camera. Once the strobe apparatus flashes, the spectrum of the flash is taken as a standard, and the pre-stored value in memory is taken as the setting value of white balance. A detail description of such can be found in U.S. Pat. No. 5,001,552, which is incorporated herein for reference. With this technique, because no other light sources are taken into consideration and the color components of the strobe apparatus is known, it is easy to achieve the white balance.

However, unless it is in a dark room, light may be reflected from other light sources and enters into the camera. As a result, the white balance effect is not satisfactory due to over-simplifying the components of color temperature.

With reference to FIG. 1, there is shown an improved white balance technique. At first, an image is captured before the strobe apparatus flashes, and the brightness Y0 of the image is determined. Next, the strobe apparatus flashes and another image is captured, and the brightness Y1 of the image is determined. By comparing the brightness Y0 and Y1, the ratio of the flash and the other light sources can be known, so as to adjust and set the white balance device. Finally, the strobe apparatus flashes and reaches a predetermined level, and an image is captured again and the captured image is adjusted based on the new white balance setting. A detail description of such can be found in U.S. Pat. No. 5,568,194, which is incorporated herein for reference. Although this technique can achieve a better white balance effect, its process is much more complicated. For example, it requires flashing for two times, and capturing image for three times, and the R/G/B signals of the whole image must be converted into Y signals prior to performing brightness comparison. Moreover, this technique only works based the following two assumptions. First, the time interval between any two of the three image-capturing operations must be very short so that the influence from light source except the strobe apparatus can be deemed as a constant. Second, the brightness of two consecutive flashing operations must be the same so that the comparison between the image captured under the first flash and the image captured with flash is meaningful. However, because the flashing operation consumes lots of energy, the main capacitor of the strobe apparatus typically requires a long time to be charged for making the brightness of two consecutive flashing operations the same, if no additional light source is provided, and this will contradict the first assumption. If the time interval is reduced, the second assumption will be contradicted due to the fact that the main capacitor can not be sufficiently charged.

Therefore, it is desirable to provide a novel auto white balance apparatus and method in a digital camera with a strobe to mitigate and/or obviate the aforementioned problems.

SUMMARY OF THE INVENTION

The object of the present invention is to provide an auto white balance apparatus and an auto white balance method in a digital camera with a strobe, which can utilize a flash module to obtain information related to the light of flash lamp and the other light source, thereby accurately adjusting the white balance setting.

In accordance with one aspect of the present invention, there is provided an auto white balance apparatus in a digital camera with a strobe, which comprises: an image sensor for capturing external images; an image processing circuit having an auto exposure control circuit for setting an exposure time based on brightness of the image captured by the image sensor; and a flash module including a flash lamp for providing light source while taking a picture, a photo detector for detecting brightness when the flash lamp flashes and converting the detected brightness into a first voltage signal, and a comparator for comparing the first voltage signal with and a reference voltage signal, so as to stop flashing the flash lamp when the first voltage signal is larger than the reference voltage signal, wherein, before the flash lamp flashes, the photo detector detects brightness based on the exposure time set by the auto exposure control circuit for establishing a second voltage signal, so as to perform a white balance adjustment based on a ratio of the reference voltage signal and the second voltage signal.

In accordance with another aspect of the present invention, there is provided an auto white balance method in a digital camera with a strobe. The digital camera has an image sensor for capturing external images and a flash module. The flash module stops flashing when a first voltage signal representing a detected brightness of the flash module is larger than a reference voltage signal. The method comprises the steps of: (A) determining an exposure time based on brightness of the image captured by the image sensor; (B) detecting brightness based on the exposure time by the flash module for establishing a second voltage signal; and (C) performing a white balance adjustment based on a ratio of the reference voltage signal and the second voltage signal.

Other objects, advantages, and novel features of the invention will become more apparent from the detailed description when taken in conjunction with the accompanying drawings.

DETAILED DESCRIPTION OF THE PREFERRED EMBODIMENT

Figure 1:
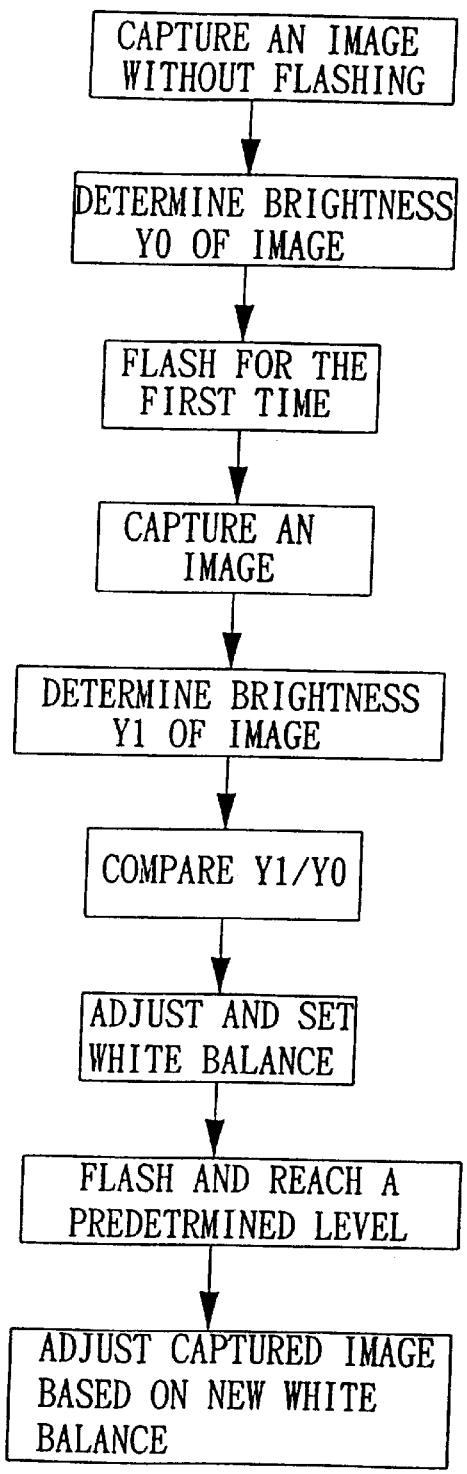
FIG. 1 is a flow chart of the white balance process carried out in a conventional camera.
Figure 2:
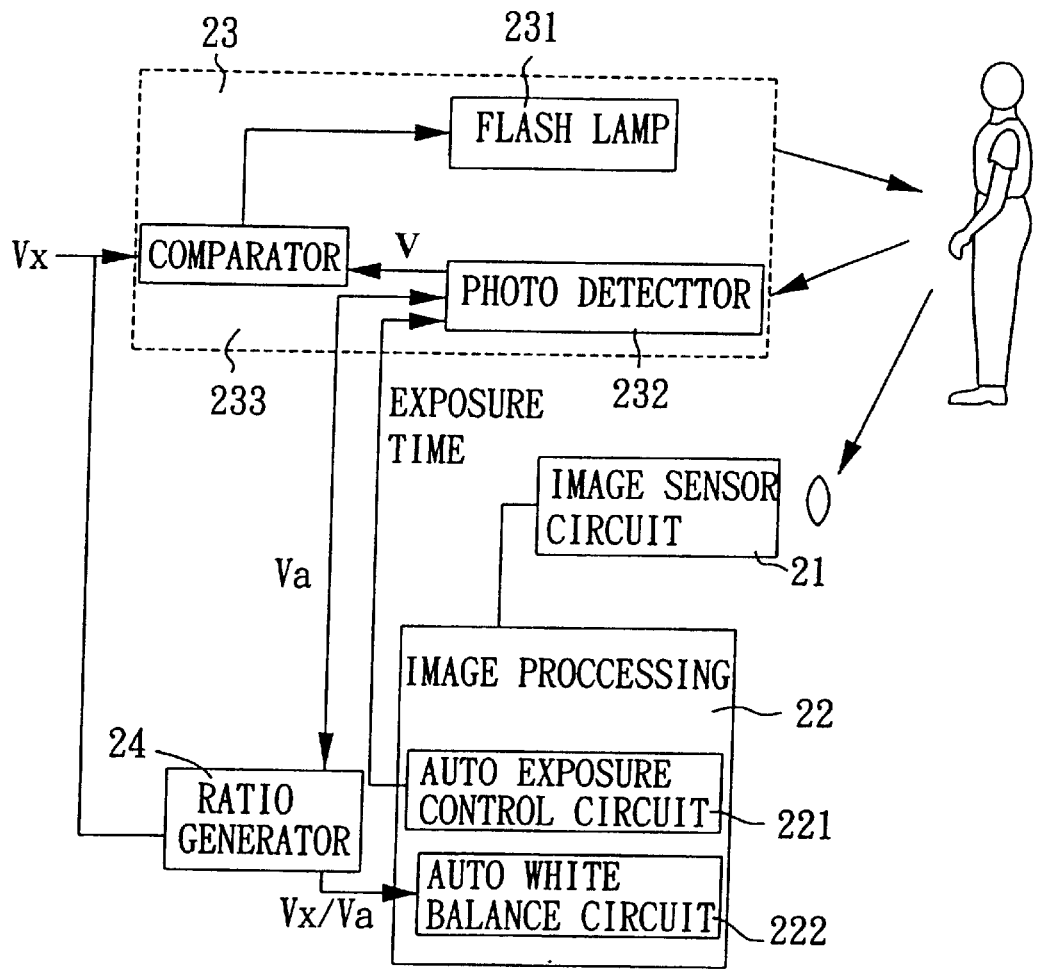
FIG. 2 is a block diagram of an auto white balance apparatus in a digital camera with a strobe in accordance with the present invention.

With reference to FIG. 2, there is shown a preferred embodiment of the auto white balance apparatus in a digital camera with a strobe in accordance with the present invention, which includes an image sensor 21, an image processing circuit 22, a flash module 23, and a ratio generator 24. The image sensor 21 is, for example, a CCD device (charge coupled device) for sensing external images. The flash module 23 includes a flash lamp 231, a photo detector 232 and a comparator 233. The flash lamp 231 is provided as a light source while taking picture. The photo detector 232 is provided for detecting brightness when the flash lamp 231 flashes, and converting the detected brightness into a first voltage signal V. The comparator 233 compares the first voltage signal V with a reference voltage signal Vx, so as to stop flashing the flash lamp 241 when the first voltage signal V is larger than the reference voltage signal Vx. Hence, the reference voltage signal Vx can represent the brightness of the flash lamp 231 while flashing to take a picture.

The image processing circuit 22 is provided to set parameters related to image fetching, and process the image sensed by the image sensor 21. The image processing circuit 22 includes an auto exposure control circuit 221 and an auto white balance circuit 222. The auto exposure control circuit 221 can set an exposure time based on the brightness of the image sensed by the image sensor 21. The auto white balance circuit 222 can set and adjust the white balance for the captured image.

Figure 3:
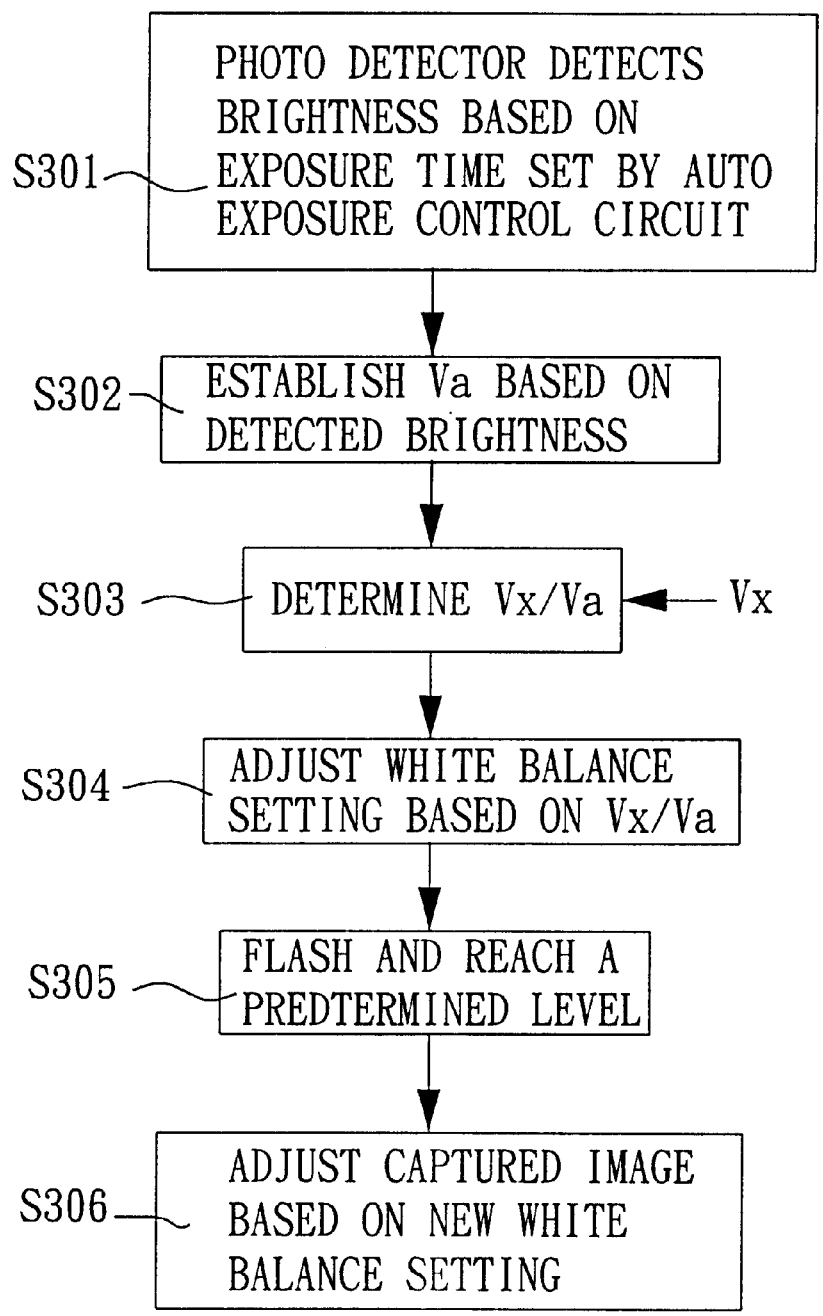
FIG. 3 is a flow chart of an auto white balance method in a digital camera with a strobe in accordance with the present invention.

In order to accurately adjust the related white balance setting, referring to FIG. 3, there is illustrated a flow chart of the auto white balance method in a digital camera with a strobe in accordance with the present invention. At first, before the flash lamp 231 flashes, the digital camera estimates the color temperature structure of the outside environment, and also, the auto exposure control circuit 221 decides an exposure time and the photo detector 232 of the flash module 23 detects brightness based on the exposure time accordingly (step S301), so as to generate a photo current for establishing a second voltage signal Va (step S302). The second voltage signal Va thus represents the brightness while taking a picture without flashing.

In step S303, the ratio generator compares the second voltage signal Va with the reference voltage signal Vx for obtaining a ratio of Vx/Va. Thus, the auto white balance circuit 222 can adjust the white balance setting based on the ratio of Vx/Va (step S304). Then, the flash lamp 231 flashes and reaches a predetermined level (step S305). Finally, an image is captured and the captured image is adjusted based on the new white balance setting (step S306).

In view of the foregoing, it is known that the present invention makes use of the ratio of Vx/Va to achieve an accurate white balance adjustment. The Va represents the brightness while taking a picture without flashing. The Vx represents the brightness while taking a picture with flashing. After determining the ratio of Vx/Va, because the color temperature structures of the flash lamp 231 and the outside environment are known, it is applicable to estimate the color temperature structure of the mixed light source (flash lamp and the outside environment), thereby precisely performing the white balance setting. In comparison with the prior art, the present invention only requires to take one picture and flash for one time. Also, in the present invention, the ratio of Vx/Va is a known value and must be a combinational influence of the flash and other light sources. However, in the prior art, the information of image light for determining the ratio of flash and other light sources is a measured value, which is determined by repeated picture taking and calculating operations. As such, the invention is advantageous over the prior art in terms of efficiency and performance because the prior art requires taking picture for three times and flashing for two times.

Although the present invention has been explained in relation to its preferred embodiment, it is to be understood that many other possible modifications and variations can be made without departing from the spirit and scope of the invention as hereinafter claimed.

What is claimed is:

1. An auto white balance apparatus in a digital camera with a strobe, comprising:

an image sensor for capturing external images;

an image processing circuit having an auto exposure control circuit for setting an exposure time based on brightness of the image captured by the image sensor; and a flash module including:
a flash lamp for providing a light source while taking a picture,
a photo detector for detecting brightness when the flash lamp flashes and converting the detected brightness into a first voltage signal, and
a comparator for comparing the first voltage signal with a reference signal, so as to stop flashing the flash lamp when the first voltage signal is larger than the reference voltage signal, wherein the flash module establishes a second voltage signal based on the exposure time set by the auto exposure control circuit before the flash lamp flashes, and performs a white balance adjustment based on a ratio of the reference voltage signal and the second voltage signal.

2. The auto white balance apparatus as claimed in claim 1, further comprising a ratio generator for comparing the second voltage signal and the reference voltage signal to generate the ratio.

3. An auto white balance method in a digital camera having an image sensor for capturing external images, an auto exposure control circuit, and a flash module, the flash module stopping flashing when a first voltage signal representing a detected brightness of the flash module is larger than a reference voltage signal, the method comprising the steps of:

(A) causing the auto exposure control circuit to determine an exposure time based on brightness of the image captured by the image sensor before the flash lamp flashes;

(B) causing the flash module to establish a second, voltage signal based on a determination of the exposure time; and (C) performing a white balance adjustment based on a ratio of the reference voltage signal and the second voltage signal.

4. The auto white balance method as claimed in claim 3, further comprising the step of (D) for, after the flash module flashes to capture an image, adjusting the image based on the white balance adjusted in step (C).

* * * * *